United States Patent Office.

WILLIAM A. LAWRENCE, OF WATERVILLE, NEW YORK.

MANUFACTURE OF HOP EXTRACTS.

SPECIFICATION forming part of Letters Patent No. 237,759, dated February 15, 1881.

Application filed July 22, 1880. (Specimens.)

*To all whom it may concern:*

Be it known that I, WILLIAM A. LAWRENCE, of Waterville, in the county of Oneida and State of New York, have invented a new and useful Application of the Lighter Products of Saccharine Substances to the Extraction of the Valuable Properties of the Hops.

My invention is based on two facts, of which, in my business of manufacturing hop extract, I believe myself to have been the first to make observation and practical application, namely: first, that a solvent which contains oxygen as one of its elements, when used for the purpose of extracting the useful substance of hops, injures, in practice, the quality and value of the resulting extract, by reason of the oxygen of the solvent oxidizing some part of the essential oil of the hops, and forming thereby an undesirable element and odor in a commercial extract of hops; second, that certain lighter and more volatile products, derived from either ethylic or methylic alcohol, and hereinafter described and defined, are rapid and complete solvents of the essential oil and bitter matter of hops, and contain, unlike the original alcohol, no oxygen to injure the product, and have no solvent power on other constituents of the plant, which, in practical operation, are either useless or harmful.

Such lighter products of alcohol, as above described, I find, for example, in the products known as the chloride and bichloride of ethyl, and the chloride and bichloride of methyl, the same being produced from ethylic and methylic alcohols by means well known and in common use, and which means of production from alcohols form no part of my invention.

In practice I bring the above described lighter products of alcohol in contact with the hops in an air-tight digester fitted with a steam-jacket. By the introduction of steam into the jacket, I bring the inclosed solvent and hops to a degree of heat varying with the kind and condition of the hops under treatment, but usually about 120° Fahrenheit. I then draw off the saturated solvent from the hops direct to a distilling apparatus of ordinary construction, wherein the solvent is distilled off, while the extract of hops remains at the bottom of the vessel, whence it is drawn off in condition for use, the volatilized solvent passing over through a suitable pipe, and being recovered by condensation, in the same way as already well known and in use with ether and gasoline solvents. In this process, among the solvents having an alcoholic radical and no oxygen, those which I prefer for practical use are either bichloride of ethyl or bichloride of methyl, both of which, as liquids of alcoholic origin, having a low boiling-point and easily volatilized, I find equally adapted to my purpose.

My extract of hops, prepared as described, is of pasty consistency, more or less thin in proportion to its temperature and the amount of essential oil contained in it.

The value and usefulness of this invention consists in the application, to the useful purpose of extracting the properties of hops, of a peculiar, distinct, and well-defined class of solvents derived from alcohols by processes already well known and in use, and the production by this new application of a valuable extract of hops.

I desire it to be understood that my method includes the use, at will, of any of the ethylic and methylic derivatives having an alcoholic radical, and in which the oxygen equivalent has been replaced by another element, and which are solvents of the oil and bitter substance of hops.

Having thus fully described my invention, what I claim as new, and desire to secure by Letters Patent, is—

The herein-described method of extracting the valuable properties of hops, by subjecting the hops in a suitable digester to the action of the above-described ethylic and methylic products of an alcoholic radical, at a suitable temperature, and separating the solvent from the extract after saturation by distillation, substantially as specified.

WILLIAM A. LAWRENCE.

Witnesses:
H. P. ALLEN,
AUG. H. ALLEN.